US012293726B2

(12) United States Patent
Deng

(10) Patent No.: US 12,293,726 B2
(45) Date of Patent: May 6, 2025

(54) GATE DRIVING CIRCUIT AND DISPLAY DEVICE

(71) Applicant: Guangzhou China Star Optoelectronics Semiconductor Display Technology Co., Ltd., Guangdong (CN)

(72) Inventor: Minghu Deng, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/564,110

(22) PCT Filed: Sep. 18, 2023

(86) PCT No.: PCT/CN2023/119483
§ 371 (c)(1),
(2) Date: Nov. 27, 2023

(87) PCT Pub. No.: WO2025/055008
PCT Pub. Date: Mar. 20, 2025

(65) Prior Publication Data

US 2025/0087167 A1 Mar. 13, 2025

(30) Foreign Application Priority Data

Sep. 11, 2023 (CN) ......................... 202311169810.5

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0819* (2013.01);
(Continued)

(58) Field of Classification Search
None
See application file for complete search history.

(56) References Cited

U.S. PATENT DOCUMENTS

2024/0312390 A1* 9/2024 Deng .................. G09G 3/2092
2024/0386858 A1* 11/2024 Deng ...................... G09G 3/36

FOREIGN PATENT DOCUMENTS

CN 104700803 A 6/2015
CN 108682396 A 10/2018
(Continued)

OTHER PUBLICATIONS

International Search Report in International application No. PCT/CN2023/119483,mailed on Nov. 24, 2023.
(Continued)

*Primary Examiner* — Christopher J Kohlman
(74) *Attorney, Agent, or Firm* — PV IP PC; Wei Te Chung

(57) ABSTRACT

The present application provides a gate driving circuit and a display device including a pull-up module, an isolation module, a pull-down maintaining module, and an inverting module. A coupling effect of an electric potential variation of a first node on an electric potential of a second node is blocked by providing the isolation module. Therefore, in a case that a clock signal fluctuates so that the electric potential of the first node fluctuates, that a change of the electric potential of the first node spreads to the electric potential of the second node is blocked, and the electric potential of the second node is stabilized. A failure of the gate driving circuit is improved.

20 Claims, 8 Drawing Sheets

(52) U.S. Cl.
CPC ............... *G09G 2310/0289* (2013.01); *G09G 2310/0297* (2013.01); *G09G 2310/08* (2013.01); *G09G 2320/045* (2013.01)

(56) References Cited

FOREIGN PATENT DOCUMENTS

| | | | |
|---|---|---|---|
| CN | 111429830 | A | 7/2020 |
| CN | 111986609 | A | 11/2020 |
| CN | 112687229 | A | 4/2021 |
| CN | 114974062 | A | 8/2022 |

OTHER PUBLICATIONS

Written Opinion of the International Search Authority in International application No. PCT/CN2023/119483,mailed on Nov. 24, 2023.

* cited by examiner

GATE DRIVING CIRCUIT AND DISPLAY DEVICE

TECHNICAL FIELD

The present application relates to the field of display technologies, and especially relates to a gate driving circuit and a display device.

BACKGROUND

An gate driving circuit in existing technologies is shown in FIG. 1, a transistor T21 of the gate driving circuit is turned on or off according to an electric potential of a first node N1. Therefore, in a case that the electric potential of the first node N1 fluctuates due to a fluctuation of the clock signal and a coupling of the clock signal through a parasitic capacitive between a gate and a source of the transistor T21, a working state of the transistor T21 is affected. An output performance of the gate driving circuit is affected. Especially for display devices with narrow border, gate driving circuits adopt a single set of inverter to achieve a pull-down maintenance of the electric potential of the first node N1, so that a pull-down effect of a pull-down maintaining module on the electric potential of the first node N1 decreases after long-term use. If the electric potential variation of the first node N1 caused by the coupling is superimposed, signals output by the gate driving circuits may be incorrect, thereby causing failures of the gate driving circuits.

SUMMARY

An object of the present application is to provide a gate driving circuit and a display device, so as to improve a failure of the gate driving circuit.

Embodiments of the present application provide a gate driving circuit including a pull-up module, an isolation module, a pull-down maintaining module, and an inverting module. The pull-up module is electrically connected to a first node. The pull-up module is configured to connect a clock signal line and a signal output terminal of the gate driving circuit, or to disconnect an electrical connection between the clock signal line and the signal output terminal according to an electric potential of the first node. The isolation module is electrically connected to the first node and a second node. The isolation module is configured to block a coupling effect of an electric potential variation of the first node on an electric potential of the second node. The pull-down maintaining module is electrically connected to the first node and a first power terminal. The inverting module is electrically connected to the second node. The inverting module is configured to control the pull-down maintaining module to connect the first power terminal and the first node, or disconnect an electrical connection between the first power terminal and the first node according to the electric potential of the second node.

Embodiments of the present application provide a display device including anyone of the gate driving circuit mentioned above.

Beneficial Effects

Compared with existing technologies, embodiments of the present application provide the gate driving circuit and the display device including the pull-up module, the isolation module, the pull-down maintaining module, and the inverting module. A coupling effect of the electric potential variation of the first node on the electric potential of the second node is blocked by providing the isolation module. Therefore, in a case that a clock signal transmitted by the clock signal line fluctuates so that the electric potential of the first node fluctuates, that the electric potential variation of the first node spreads to the electric potential of the second node is blocked, and the electric potential of the second node is stabilized. The inverting module can control the pull-down maintaining module according to the electric potential of the second node to maintain an effect on the first node. A failure of the gate driving circuit, which is caused by incorrect output signal of the gate driving circuit due to a fact that a pull-down effect of the pull-down maintaining module on the electric potential of the first node decreases after long-term use and the electric potential of the first node fluctuates under an effect of the coupling as the clock signal changes, is improved.

DETAILED DESCRIPTION OF THE EMBODIMENT

The present application is further described in detail below with reference to the accompanying drawings and examples in order to make the purpose, technical solutions and effects of the present application more clear and definite.

Figure 1:
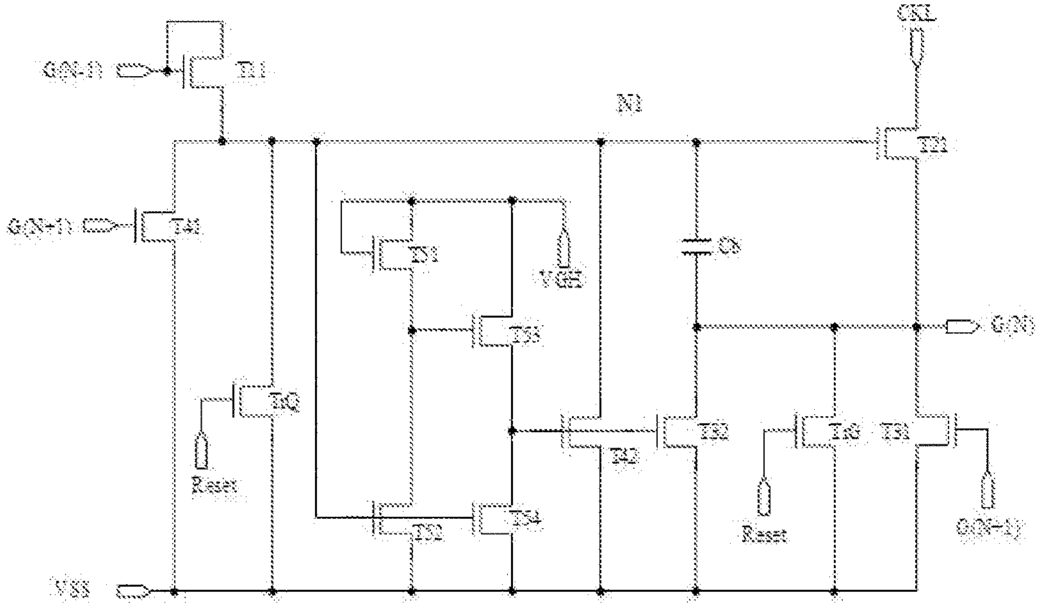
FIG. 1 is a schematic structural diagram of a gate driving circuit in prior art.
Figure 2:
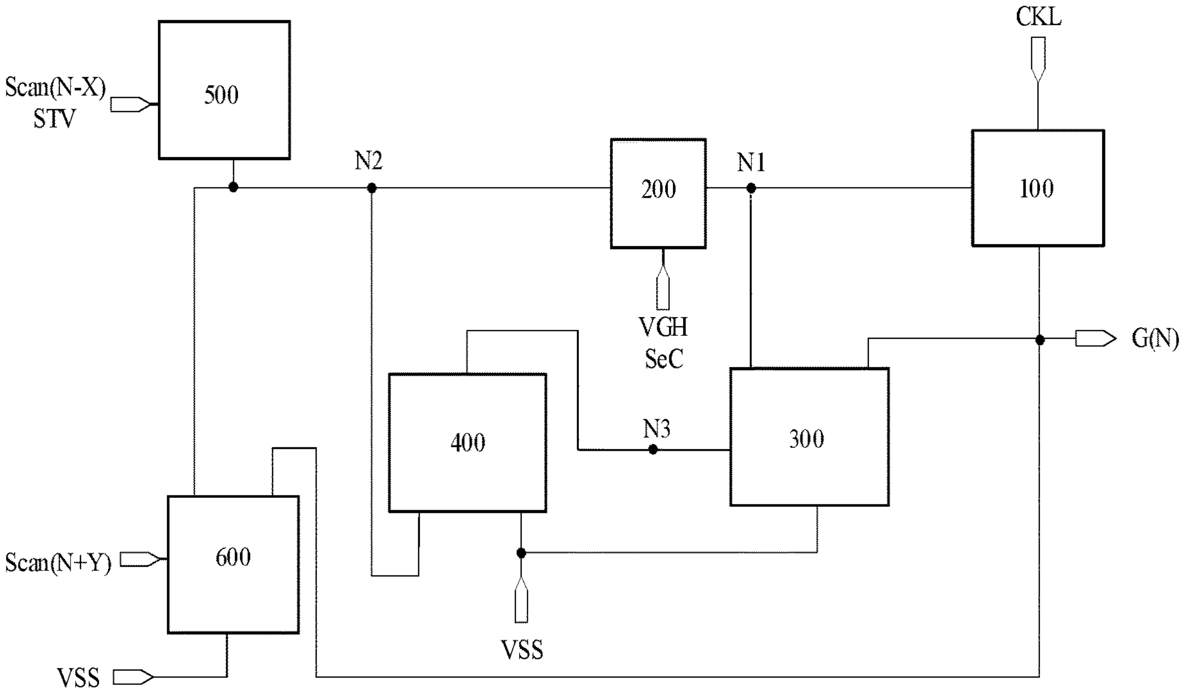
FIG. 2 is a first structural schematic block diagram of a gate driving circuit provided by embodiments of the present application.

Particularly, FIG. 2 is a first structural schematic block diagram of a gate driving circuit provided by embodiments of the present application. Embodiments of the present application provides a gate driving circuit, which includes a pull-up module 100, an isolation module 200, a pull-down maintaining module module 300, and an inverting module 400.

The pull-up module 100 is electrically connected to a first node N1. The pull-up module 100 is configured to connect a clock signal line CKL and a signal output terminal G(N) of the gate driving circuit, or to disconnect an electrical connection between the clock signal line CKL and the signal output terminal G(N) of the gate driving circuit according to an electric potential of the first node N1.

Optionally, the clock signal line CKL transmits a clock signal CK.

Figure 3:
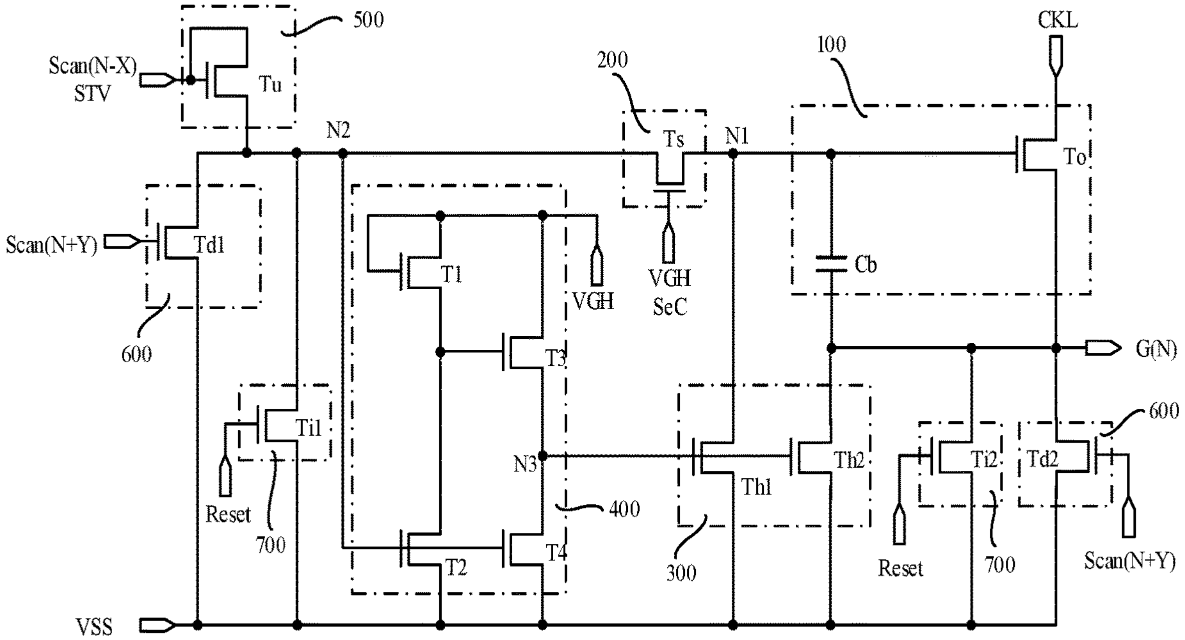
FIG. 3 a first circuit schematic diagram of a gate driving circuit provided by embodiments of the present application.

FIG. 3 a first circuit schematic diagram of a gate driving circuit provided by embodiments of the present application. The pull-up module 100 includes a pull-up transistor To and a bootstrap capacitor Cb. A control terminal of the pull-up transistor To is electrically connected to the first node N1, an input terminal of the pull-up transistor To is electrically connected to the clock signal line CKL, and an output terminal of the pull-up transistor To is electrically connected to the signal output terminal G(N). The bootstrap capacitor Cb is connected in series between the first node N1 and the signal output terminal G(N).

Wherein, the pull-up transistor To is configured to be turned on or off according to the electric potential of the first node N1, so that the clock signal CK is transmitted to the signal output terminal G(N) in a case that the pull-up transistor To is turned on. The bootstrap capacitor Cb is configured to bootstrap the electric potential of the first node N1 according to the clock signal CK in the case that the pull-up transistor To is turned on.

Please continue to refer to FIG. 2, the isolation module 200 is electrically connected to the first node N1 and a second node N2. The isolation module 200 is configured to block a coupling effect of the electric potential variation of the first node N1 on an electric potential of the second node N2.

In a specific embodiment, as shown in FIG. 3, the isolation module 200 includes an isolation transistor Ts. An input of the isolation transistor Ts is electrically connected to the second node N2, and an output of the isolation transistor Ts is electrically connected to the first node N1.

Optionally, a control terminal of the isolation transistor Ts may be electrically connected to the second power terminal V2, so that the isolation transistor Ts is always in a state that is turned on.

Optionally, the isolation transistor Ts is an N-type transistor. A voltage supplied by the second power terminal V2 is greater than a voltage supplied by the first power terminal VSS. Optionally, a third power terminal VGH can be multiplexed into the second power terminal V2.

Optionally, the isolation transistor Ts is a P-type transistor. The first power terminal VSS can be multiplexed into the second power terminal V2.

Optionally, a control terminal of the isolation transistor Ts may be electrically connected to an isolation control signal SeC, so that the isolation transistor Ts is turned on or off according to the isolation control signal SeC. An effect of blocking an influence of the electric potential of the first node N1 on the electric potential of the second node N2 is improved, and power consumption of the gate driving circuit is reduced.

Referring to FIG. 2, the inverting module 400 is electrically connected to the second Node N2. The inverting module 400 is configured to control a pull-down maintaining module 300 to connect the first power terminal VSS and the first node N1, or to disconnect an electrical connection between the first power terminal VSS and the first node N1 according to the electric potential of the second node N2.

In a specific embodiment, as shown in FIG. 3, the inverting module 400 includes a first transistor T1, a second transistor T2, a third transistor T3, and a fourth transistor T4. A control terminal of the first transistor T1 is electrically connected to the third power terminal VGH. An input terminal of the first transistor T1 is electrically connected to the third power terminal VGH. A control terminal of the second transistor T2 is electrically connected to the second node N2. An output terminal of the second transistor T2 is electrically connected to an output terminal of the first transistor T1. An input terminal of the second transistor T2 is electrically connected to the first power terminal VSS. A control terminal of the third transistor T3 is electrically connected to the output terminal of the first transistor T1. An input terminal of the third transistor T3 is electrically connected to the third power terminal VGH. An output terminal of the third transistor T3 is electrically connected to the pull-down maintaining module 300 through a third node N3. A control terminal of the fourth transistor T4 is electrically connected to the second node N2. An input terminal of the fourth transistor T4 is electrically connected to the first power terminal VSS. An output terminal of the fourth transistor T4 is electrically connected to the third node N3.

The control terminals of the second transistor T2 and the fourth transistor T4 are electrically connected to the second node N2. Thus, not only the isolation module 200 can be used to block the influence of the electric potential variation of the first node N1 on the electric potential of the second node N2, but also the second transistor T2 and the fourth transistor T4 can maintain the electrical connection between the first power terminal VSS and the first node N1 according to the electric potential of the second node N2. And then, the second transistor T2 and the fourth transistor T4 can maintain the effect on the first node N1, so that a probability that an effective pulse of the gate control signal Scan(N) output by the gate driving circuit is mistakenly output is reduced, thereby improving the output stability of the gate driving circuit.

In addition, the control terminals of the second transistor T2 and the fourth transistor T4 are electrically connected to the second node N2, so that a load corresponding to the first node N1 is reduced. Therefore, factors that interfere with the electric potential of the first node N1 are reduced, which is beneficial to improving a stability of the electric potential of the first node N1, thereby making a waveform of the potential variation of the first node N1 tend to satisfy design expectation.

Referring to FIG. 2, the pull-down maintaining module 300 is electrically connected to the first node N1 and the first power terminal VSS. The pull-down maintaining module 300 is configured to connect the first power terminal VSS and the first node N1, or to disconnect an electrical connection between the first power terminal VSS and the first node N1.

In a specific embodiment, as shown in FIG. 3, the pull-down maintaining module 300 includes a first pull-down maintaining transistor Th1. A control terminal of the first pull-down maintaining transistor Th1 is electrically connected to the third node N3. An input terminal of the first pull-down maintaining transistor Th1 is electrically connected to the first power terminal VSS. An output terminal of the first pull-down maintaining transistor Th1 is electrically connected to the first node N1. The first pull-down sustain transistor Th1 is configured to connect the first power terminal VSS and the first node N1, or to disconnect an electrical connection between the first power terminal VSS and the first node N1 according to an electric potential of the third node N3.

Optionally, the first pull-down maintaining transistor Th1 is an N-type transistor. The voltage supplied by the second power terminal V2 is greater than the voltage supplied by the first power terminal VSS.

Optionally, as shown in FIG. 3, the pull-down maintaining module 300 further includes a second pull-down maintaining transistor Th2. A control terminal of the second pull-down maintaining transistor Th2 is electrically connected to the third node N3. An input terminal the second pull-down maintaining transistor Th2 is electrically connected to the first power terminal VSS. An output terminal of the second pull-down maintaining transistor Th2 is electrically connected to the signal output terminal G(N). The second pull-down sustain transistor Th2 is configured to connect the first power terminal VSS and the signal output terminal G(N), or to disconnect an electrical connection between the first power terminal VSS and the signal output terminal G(N) according to the electric potential of the third node N3.

The gate driving circuit provided by the embodiments of the present application reduces the influence of the electric potential variation of the first node N1 on the electric potential of the second node N2 by providing the isolation module 200. And then, the inverting module 400 electrically connected to the second node N2 can Stably control the pull-down maintaining module 300 to maintain the electrical connection between the first power terminal VSS and the first node N1 according to the electric potential of the second node N2. Therefore, the first node N1 can be stabilized by the first voltage supplied by the first power terminal VSS, thereby reducing a risk of failure of the gate driving circuit.

In practical application, the pull-up transistor To is generally the largest transistor in the gate driving circuit, so a parasitic capacitance corresponding to the pull-up transistor To is also large. In a case that the isolation module 200 is arranged, an influence of the electric potential fluctuation of the first node N1 on the electric potential of the second node N2 and the pull-down maintaining module 300 can be reduced, which is verified by the inventors with actual products.

Figure 4:
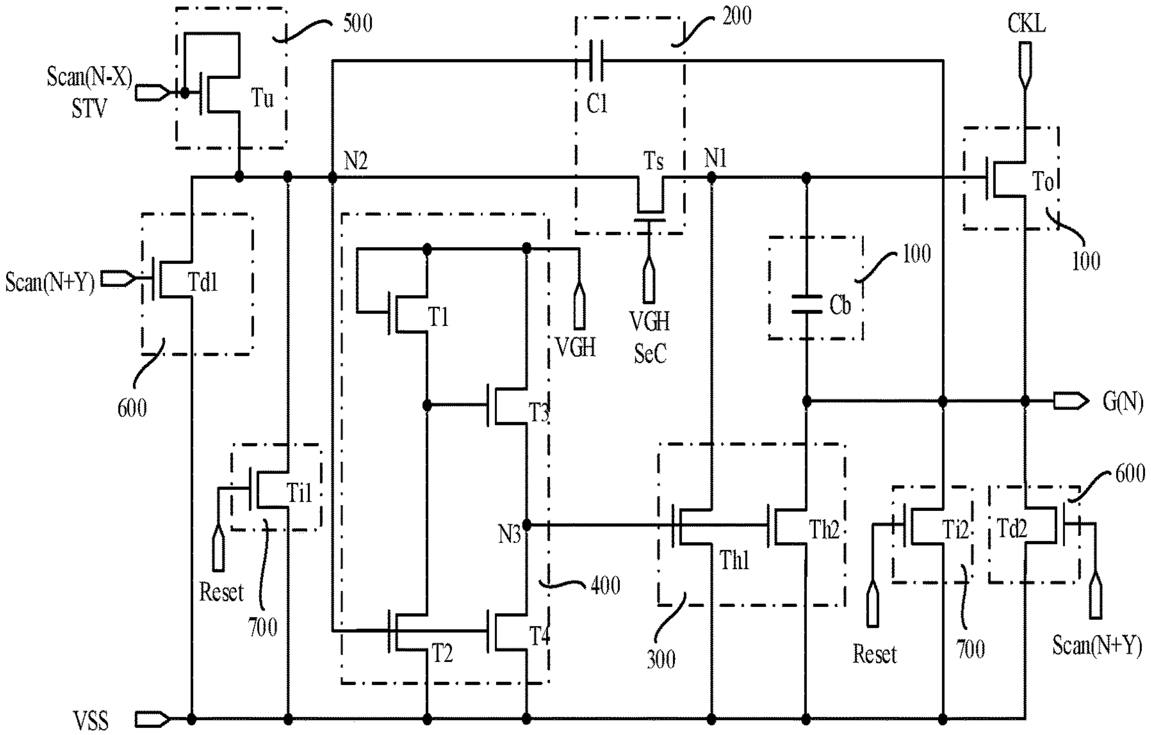
FIG. 4 is a second circuit schematic diagram of a gate driving circuit provided by embodiments of the present application.

FIG. 4 is a second circuit schematic diagram of a gate driving circuit provided by embodiments of the present application. Optionally, in some embodiments of the present application, the isolation module 200 further includes a first capacitor C1 connected in series between the signal output terminal G(N) and the second node N2. The electric potential of the second node N2 is further stabilized through the first capacitor C1. Thus, in a case that the gate control signal Scan(N) output by the signal output terminal G(N) has a leap from a low-level state to a high-level state, the electric potential of the second node N2 is coupled through the first capacitor C1, so that the inverting module 400 can further stably control the pull-down maintaining module 300 to disconnect the electrical connection between the first power terminal VSS and the first node N1. A stability of the electric potential of the first node N1 is maintained, and a probability that the electric potential of the first node N1 is abnormally pulled down is reduced. However, in a case that the gate control signal Scan(N) output by the signal output terminal G(N) has a leap from a high-level state to a low-level state, the electric potential of the second node N2 is coupled through the first capacitor C1, so that the inverting module 400 can further stably control the pull-down maintaining module 300 to maintain the electrical connection between the first power terminal VSS and the first node N1. The first node N1 can be affected by the first voltage supplied by the first power terminal VSS and remain stable.

Optionally, please continue to refer to FIG. 2, the gate driving circuit further includes a pull-up control module 500. The pull-up control module 500 is configured to raise the electric potentials of the first node N1 and the second node N2 according to a pull-up control signal Scan(N−X).

In some specific embodiments, please refer to FIGS. 3 and 4 together, the pull-up control module 500 includes a pull-up control transistor Tu. A control terminal and an input terminal of the pull-up control transistor Tu are configured to receive the pull-up control signal Scan(N−X), an output terminal of the pull-up control transistor Tu is electrically connected to the second node N2.

Optionally, please continue to refer to FIG. 2, the gate driving circuit further includes a pull-down module 600. The pull-down module 600 is configured to electrically connect the first power terminal VSS and the second node N2 according to a pull-down control signal Scan(N+Y).

In some specific embodiments, please refer to FIGS. 3 and 4 together, the pull-down module 600 includes a first pull-down transistor Td1. A control terminal of the first pull-down transistor Td1 is configured to receive the pull-down control signal Scan(N+Y). An input terminal of the first pull-down transistor Td1 is electrically connected to the first power terminal VSS. An output terminal of the first pull-down transistor Td1 is electrically connected to the second node N2. The first pull-down transistor Td1 is configured to disconnect an electrical connection between the second node N2 and the first power terminal VSS, or to connect the second node N2 and the first power terminal VSS according to the pull-down control signal Scan(N+Y). Thus, the inverting module 400 controls the pull-down maintaining module 300 to achieve the electrical connection between the first power terminal VSS and the first node N1.

In some specific embodiments, please refer to FIGS. 3 and 4 together, the pull-down module 600 is further configured to electrically connect the first power terminal VSS and the signal output terminal G(N) according to the pull-down control signal Scan(N+Y). Optionally, the pull-down module 600 includes a second pull-down transistor Td2. A control terminal of the second pull-down transistor Td2 is configured to receive the pull-down control signal Scan(N+Y). An input terminal of the second pull-down transistor Td2 is electrically connected to the first power terminal VSS. An output terminal of the second pull-down transistor Td2 is electrically connected to the signal output terminal G(N). The second pull-down transistor Td2 is configured to connect the signal output terminal G(N) and the first power terminal VSS, or to disconnect the electrical connection between the signal output terminal G(N) and the first power terminal VSS according to the pull-down control signal Scan(N+Y).

Figure 5:
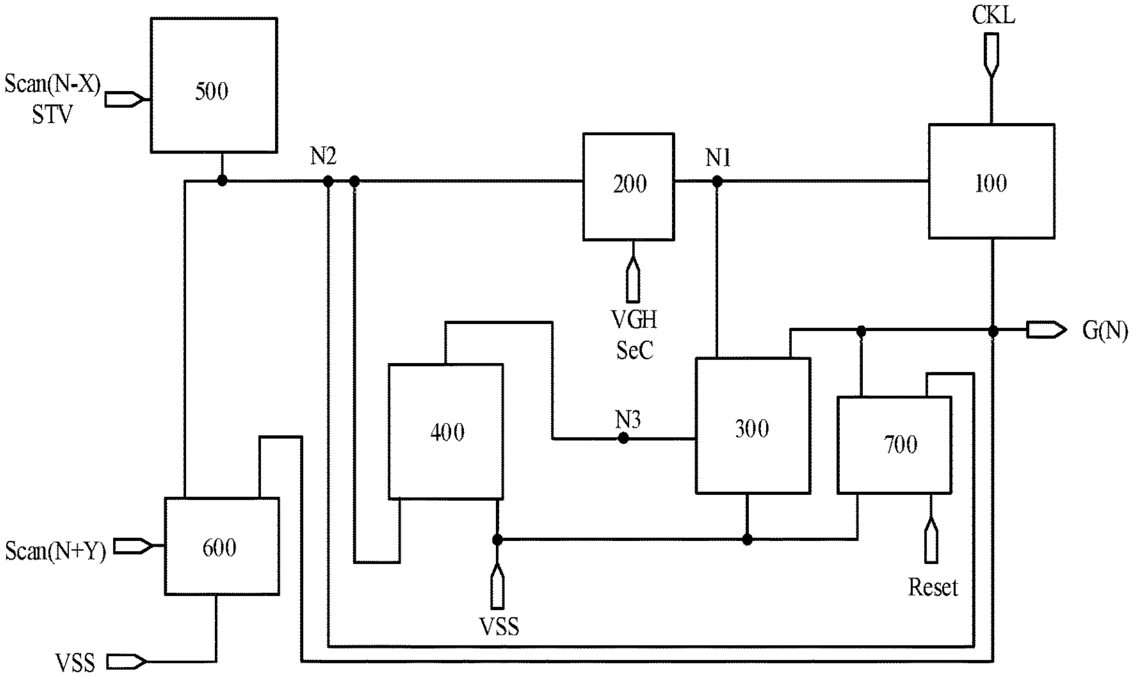
FIG. 5 is a second structural schematic block diagram of a gate driving circuit provided by embodiments of the present application.

FIG. 5 is a second structural schematic block diagram of a gate driving circuit provided by embodiments of the present application. The gate driving circuit further includes a reset module 700. The reset module 700 is configured to initialize the electric potential of the second node N2 according to a reset control signal Reset.

In some specific embodiments, please refer to FIGS. 3 and 4 together, the reset module 700 includes a first reset transistor Ti1. A control terminal of the first reset transistor Ti1 is configured to receive the reset control signal Reset. An input terminal of the first reset transistor Ti1 is electrically connected to the first power terminal VSS. An output terminal of the first reset transistor Ti1 is electrically connected to the second node N2. The first reset transistor Ti1 is configured to connect the first power terminal VSS and the second node N2, or to disconnect the electrical connection between the first power terminal VSS and the second node N2 according to the reset control signal Reset.

Optionally, the reset module 700 is configured to initialize the electric potential of the signal output terminal G(N) according to the reset control signal Reset.

Optionally, as shown in FIGS. 3 to 4, the reset module 700 further includes a second reset transistor Ti2. A control terminal of the second reset transistor Ti2 is configured to receive the reset control signal Reset. An input terminal of the second reset transistors Ti2 is electrically connected to the first power terminal VSS. An output terminal of the second reset transistor Ti2 is electrically connected to the signal output terminal G(N). The second reset transistor Ti2 is configured to connect the first power terminal VSS and the signal output terminal G(N), or to disconnect the electrical connection between the first power terminal VSS and the signal output terminal G(N) according to the reset control signal Reset.

In addition, since the first reset transistor Ti1 and the second reset transistor Ti2 can be turned on at the same time according to the reset control signal Reset. Thus, the first reset transistor Ti1, the second reset transistor Ti2, and the first power terminal VSS can be configured to initialize the electric potentials of two electrode plates the first capacitor C1.

Optionally, in a case the gate driving circuit is applied to a display panel, the reset control signal Reset can has an effective pulse within an end time (including a time after the last row of sub-pixels is driven, and a vertical blanking interval) of the display panel displaying one frame. Thus, residual charges of the second node N2 and the signal output terminal G(N) are eliminated to improve a display quality.

Optionally, in a case the gate driving circuit is applied to a display panel, the reset control signal Reset may have an effective pulse after the display panel is turned on, so as to initialize the electric potentials of the second node N2 and the signal output terminal G(N) before the display panel displays a picture.

Figure 6:
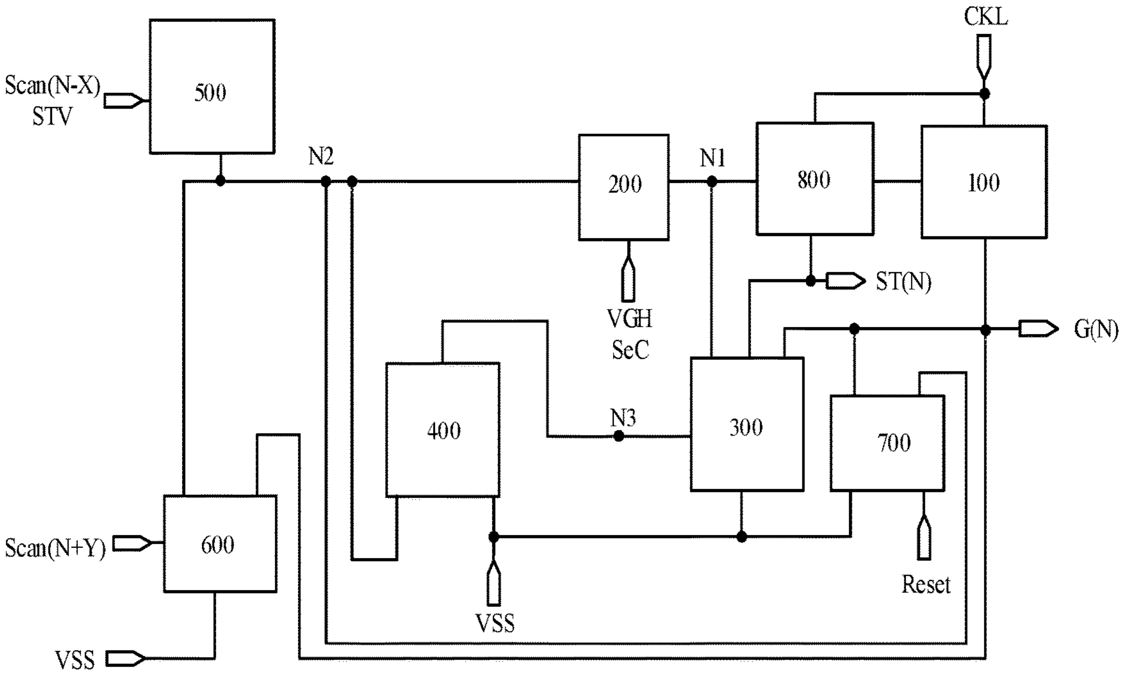
FIG. 6 is a third structural schematic block diagram of a gate driving circuit provided by embodiments of the present application.

FIG. 6 is a third structural schematic block diagram of a gate driving circuit provided by embodiments of the present application. The gate driving circuit may further include a stage transmission module 800. The stage transmission module 800 is electrically connected to the first node N1 and the clock signal line CKL. The stage transmission module 800 is configured to connect the clock signal line CKL and a stage transmission output terminal ST(N) of the gate driving circuit, or to disconnect an electrical connection between the clock signal line CKL and the stage transmission output terminal ST(N) of the gate driving circuit according to the electric potential of the first node N1. Thus, in a device using the gate driving circuit, a plurality of gate driving circuits can achieve a cascading settings with the help of the stage transmission module 800.

Figure 7:
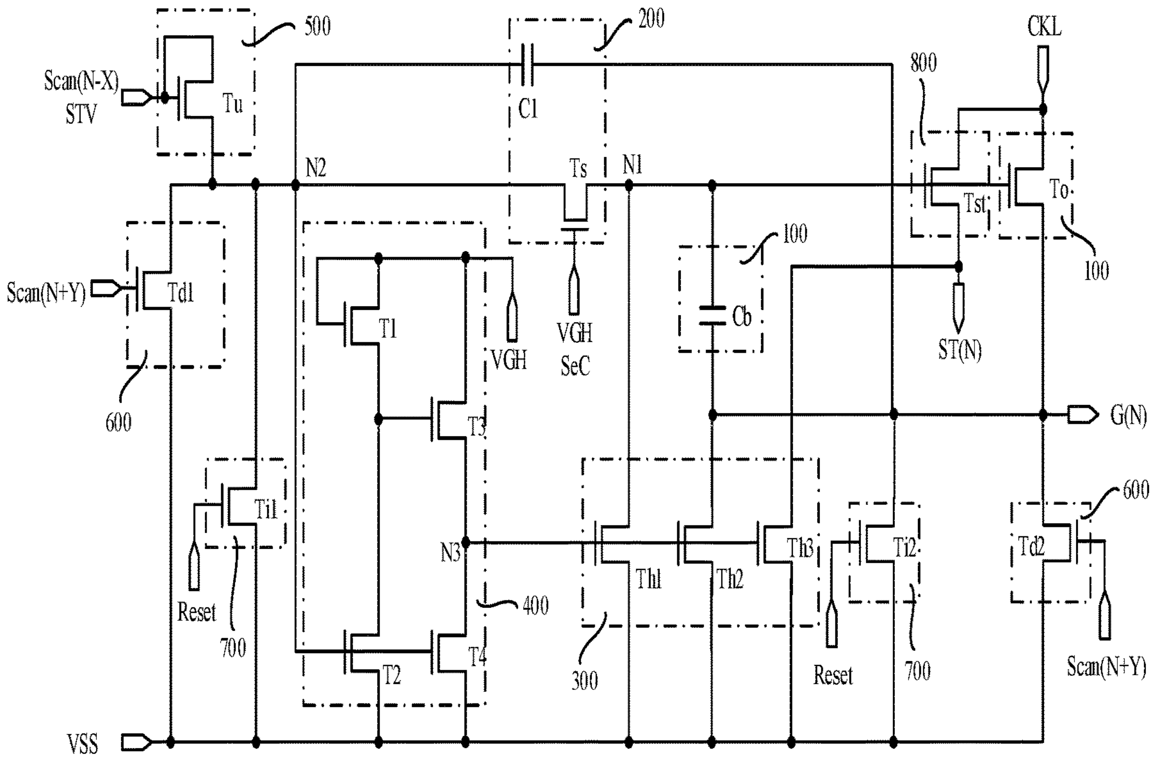
FIG. 7 is a third circuit schematic diagram of a gate driving circuit provided by embodiments of the present application.

FIG. 7 is a third circuit schematic diagram of a gate driving circuit provided by embodiments of the present application. The stage transmission module 800 includes a stage transmission transistor Tst. A control terminal of the stage transmission transistor Tst is electrically connected to the first node N1. An input terminal of the stage transmission transistor Tst is electrically connected to the clock signal line CKL. An output of the stage transmission transistor Tst is electrically connected to the stage transmission output terminal ST(N).

Optionally, as shown in FIG. 7, the pull-down maintaining module 300 further includes a third pull-down maintaining transistor Th3. A control terminal of the third pull-down maintaining transistor Th3 is electrically connected to the third node N3. An input terminal of the third pull-down maintaining transistor Th3 is electrically connected to the first power terminal VSS. An output terminal of the third pull-down maintaining transistor Th3 is electrically connected to the stage transmission output terminal ST(N).

Optionally, the gate driving circuit may be provided with two sets of the inverting modules 400 and two sets of the pull-down maintaining modules 300. A topological structure of each set of the inverting modules 400 may be arranged with reference to the inverting module 400 shown in FIG. 3. Control terminals of the first transistor T1, input terminals of the first transistor T1, and input terminals of the third transistor T3 included in the two sets of inverting modules 400 receive control signals that are inverse, respectively. Control terminals of the second transistor T2 and control terminals of the fourth transistor T4 are still electrically connected to the second node N2.

Figure 8:
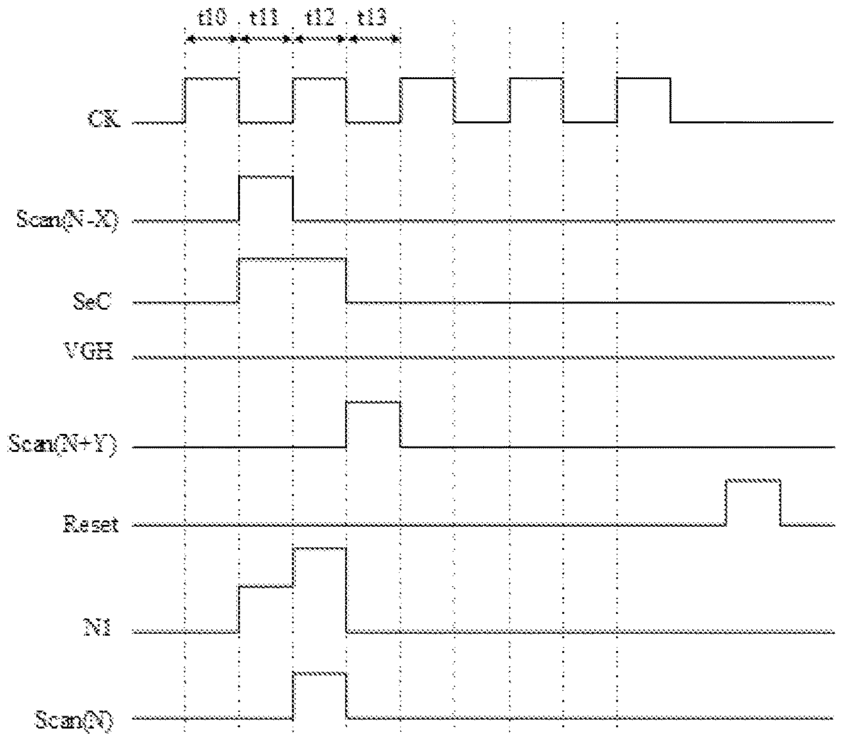
FIG. 8 is a timing diagram applied by a gate driving circuit provided by embodiments of the present application.

FIG. 8 is a timing diagram applied by a gate driving circuit provided by embodiments of the present application. Taking it that each transistor included in the gate driving circuit is an N-type transistor as an example, a operation principle of the gate driving circuit is described as follows.

An initial stage t10, the clock signal CK transmitted by the clock signal line CKL is high-level voltage, and the pull-up control signal Scan(N−X), the reset control signal Reset and the pull-down control signal Scan(N+Y) are low-level voltages.

The pull-up control transistor Tu is turned off according to the pull-up control signal Scan(N−X). The first transistor T1 is turned on according to a third voltage supplied by the third power terminal VGH, so that the third transistor T3 is turned on. The first pull-down maintaining transistor Th1 and the second pull-down maintaining transistor Th2 are turned on, and the first power terminal VSS is electrically connected to the first node N1 and the signal output terminal G(N). The electric potential of the first node N1 remains at a low level state, and the gate control signal Scan(N) output by the signal output terminal G(N) has a low level state.

In the case that the control terminal of the isolation transistor Ts is electrically connected to the second power terminal V2, the isolation transistor Ts remains to be turned on in the initial stage t10. In the case that the control terminal of the isolation transistor Ts receives the isolation control signal SeC, the isolation transistor Ts can remain to be turned on or off in the initial stage t10.

Optionally, in order to prevent the electric potential of the second node N2 from affecting the electric potential of the first node N1 in the initial stage t10, the first reset transistor Ti1 may be turned on according to the reset control signal Reset with an effective pulse before the initial stage t10, so that the electric potential of the second node N2 is at a low level state before the initial stage t10.

A pre-charge stage t11, the pull-up control signal Scan (N−X) is high-level voltage, and the clock signal CK, the reset control signal Reset and the pull-down control signal Scan(N+Y) are low-level voltages.

In the case that the control terminal of the isolation transistor Ts is electrically connected to the second power terminal V2, the isolation transistor Ts remains to be turned on in the pre-charging stage t11. In the case that the control terminal of the isolation transistor Ts receives the isolation control signal SeC, the isolation transistor Ts can remain to be turned on according to an effective pulse of the isolation control signal SeC in the pre-charging stage t11.

The pull-up control transistor Tu is turned on, so that the electric potential of the first node N1 and the electric potential of the second node N2 are raised. Then, the pull-up transistor To, the second transistor T2 and the fourth transistor T4 are turned on. As a result, the gate control signal Scan(N) is kept at a low level state, and the first pull-down maintaining transistor Th1 and the second pull-down maintaining transistor Th2 are turned off.

An output stage t12, the clock signal CK is a high-level voltage, and the pull-up control signal Scan(N−X), the reset control signal Reset and the pull-down control signal Scan (N+Y) are low-level voltages.

In the case that the control terminal of the isolation transistor Ts is electrically connected to the second power terminal V2, the isolation transistor Ts remains to be turned on in the output stage t12. In the case that the control terminal of the isolation transistor Ts receives the isolation control signal SeC, the isolation transistor Ts can remain to be turned on according to the effective pulse of the isolation control signal SeC in the output stage t12.

The pull-up control transistor Tu is turned off, the electric potential of the first node N1 is further raised. As a result, the pull-up transistor To, the second transistor T2, and the fourth transistor T4 remain to be turned on, so that the gate control signal Scan (N) has a high level state, and the first pull-down maintaining transistor Th1 and the second pull-down maintaining transistor Th2 remain to be turned off.

A pull-down stage t13, the pull-down control signal Scan(N+Y) is a high-level voltage, and the pull-up control signal Scan(N−X), the reset control signal Reset and the clock signal CK are low-level voltages.

In the case that the control terminal of the isolation transistor Ts is electrically connected to the second power terminal V2, the isolation transistor Ts remains to be turned on in the pull-down stage t13. In the case that the control terminal of the isolation transistor Ts receives the isolation control signal SeC, the isolation transistor Ts can be turned on or off in the pull-down stage t13.

The first pull-down transistor Td1 and the second pull-down transistor Td2 are turned on according to the pull-down control signal Scan(N+Y). The first power terminal VSS are electrically connected to the second node N2 and the signal output terminal G(N). Thus, the gate control signal Scan(N) has a low level state, the electric potential of the second node N2 is pulled down, and the second transistor T2 and the fourth transistor T4 are turned off. The first transistor T1, the third transistor T3, the first pull-down maintaining transistor Th1, and the second pull-down maintaining transistor Th2 are turned on, the electric potential of the first node N1 is pulled down, and the pull-up transistor To is turned off.

Thereafter, the reset control signal Reset may have an effective pulse, so that the first reset transistor Ti1 and the second reset transistor Ti2 are turned on to initialize the electric potential of the second node N2, the electric potential of the signal output terminal G(N), and the electric potentials of two electrode plates of the first capacitor C1.

Figure 9:
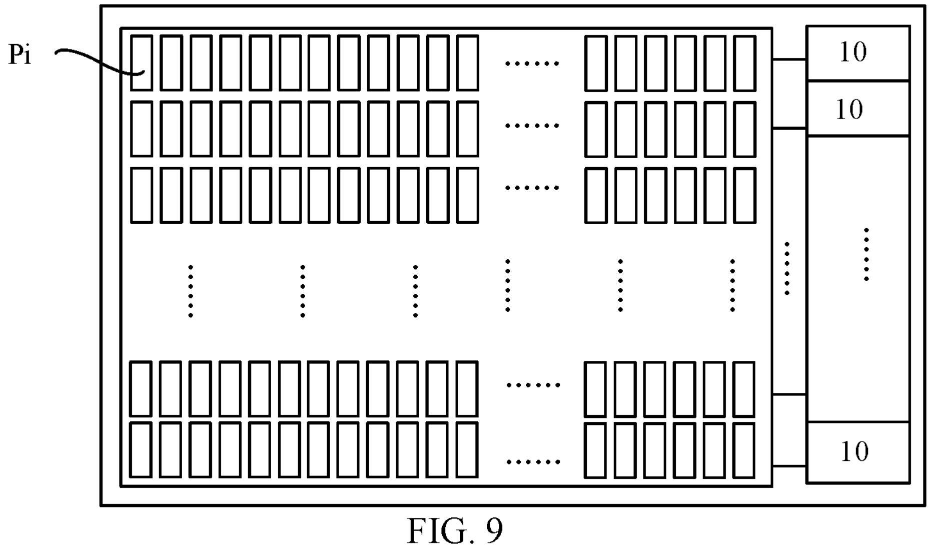
FIG. 9 is a schematic structural diagram of a display device provided by embodiments of the present application.

FIG. 9 is a schematic structural diagram of a display device provided by embodiments of the present application. Embodiments of the present application provide a display device including anyone of the gate driving circuits mentioned above.

Optionally, the display device includes a display panel and a gate driving unit. The display panel is electrically connected to the gate driving unit. The gate driving unit including a plurality of the gate driving circuits (as shown in 10 in FIG. 9), the plurality of gate driving circuits 10 are arranged in cascade.

Optionally, the display panel includes a passive light-emitting display panel (For example, a liquid crystal display panel, and a reflective display panel.), a self-emitting display panel (For example, a display panel including light emitting devices such as organic light emitting diodes, sub-millimeter light emitting diodes, and micro light emitting diodes as subpixels), and etc.

Optionally, the display panel includes a plurality of subpixels Pi. The plurality of subpixels Pi include pixel driving circuits. At least one transistor in the pixel driving circuit is electrically connected to a corresponding one of the gate driving circuits 10.

Optionally, the pixel driving circuit can be designed in the form of one of 2T1C (two transistors and one capacitor), 5T2C, 7T1C, 7T2C, 8T2C, and etc.

Optionally, in a case that the pixel driving circuit adopts the form of 7T1C, the gate driving unit may be electrically connected to a reset transistor for realizing a potential reset of a control terminal of a driving transistor, a compensation transistor for compensating a threshold voltage of the driving transistor, or a data transistor for controlling a writing of data signals into the control terminal of the driving transistor.

Optionally, the gate driving unit may be electrically connected to a plurality of clock signal lines, so that the plurality of gate driving circuits 10 generate effective pulses of the gate control signals Scan(N) according to the clock signals CK transmitted by the plurality of clock signal lines.

Optionally, the plurality of the gate driving circuits 10 are electrically connected to m clock signal lines. $m \geq 2$, and m can be determined according to different design requirements. Optionally, m is equal to 2, 6, 8, 12, and etc.

Figure 10:
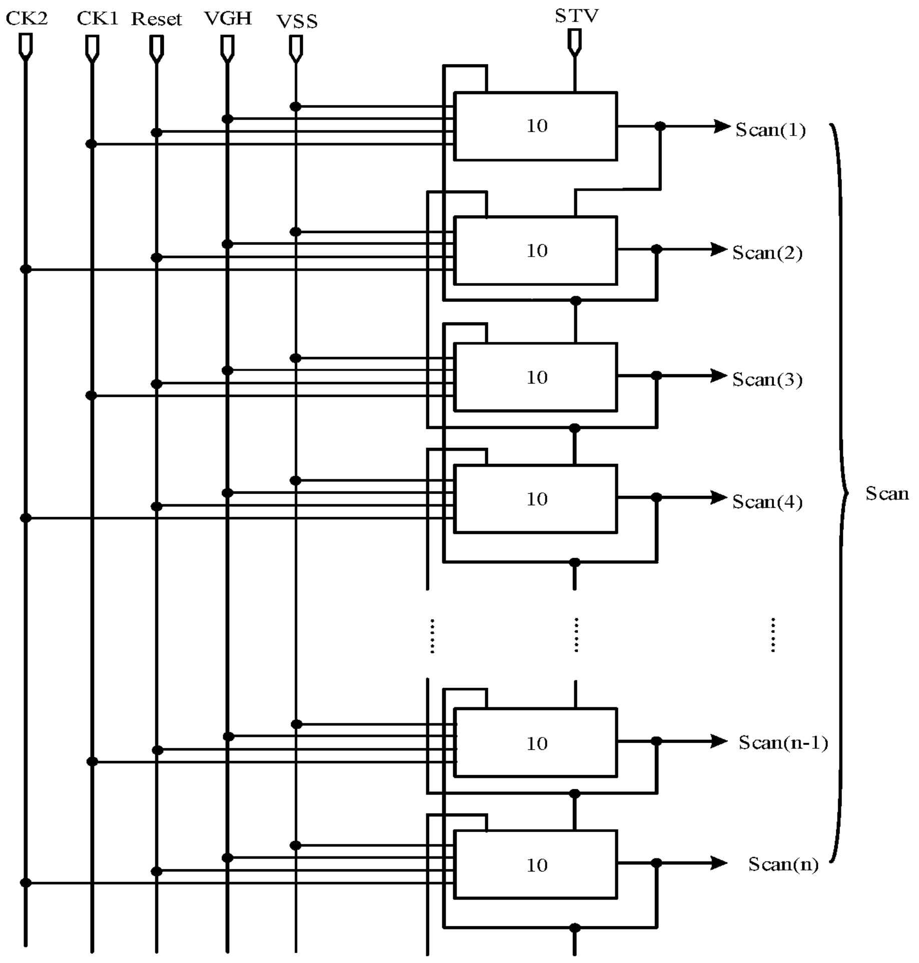
FIG. 10 is a first cascade schematic diagram of a plurality of stages of the gate driving circuits provided by embodiments of the present application.

FIG. 10 is a first cascade schematic diagram of a plurality of stages of the gate driving circuits provided by embodiments of the present application. The plurality of the gate driving circuits 10 are electrically connected to two clock signal lines (that is, a first clock signal line and a second clock signal line). A first clock signal CK1 transmitted by the first clock signal line and A second clock signal CK2 transmitted by the second clock signal line are in reverse phase. Optionally, the gate driving circuits of odd-numbered stages are electrically connected to the first clock signal line, and the gate driving circuits of the even-numbered stages are electrically connected to the second clock signal line.

Optionally, in the case that the plurality of the gate driving circuits 10 are arranged in cascade, a pull-up control signal received by the first stage gate driving circuit may be a start signal STV. However, other gate driving circuits cascaded behind the first gate driving circuit can use a stage transmission signal output from the stage transmission output terminal of a preceding stage gate driving circuit, or a gate control signal output from the signal output terminal of the preceding stage gate driving circuit as the pull-up control signal.

For example, the N-th stage gate driving circuit disposed after the first stage gate driving circuit can use a stage transmission signal or a gate control signal Scan(N−X) output by the (N−X)-th stage gate driving circuit as the pull-up control signal. Herein, $N>1, X \geq 1$, and $N-X \geq 1$.

Optionally, in the case that the plurality of gate driving circuits are arranged in cascade, a stage transmission signal or a gate control signal output by a succeeding stage gate driving circuit can be used as a pull-down control signal of the preceding stage gate driving circuit.

For example, the M-th gate driving circuit can use a stage transmission signal or a gate control signal Scan(N+Y) output by the (M+Y)-th stage gate driving circuit as the pull down control signal. Herein, M≥1 and Y≥1.

Optionally, please continue to refer to FIG. 10, the control terminals of the isolation transistors Ts of the plurality of gate driving circuits may be electrically connected to the second power terminals. Thus, the isolation transistors Ts of the plurality of gate driving circuits remain to be turned on all the time, thereby reducing control complexity of the display device. In a case that the isolation transistor Ts is an N-type transistor, the third power terminal VGH may be multiplexed into the second power terminal. In a case that the isolation transistor Ts is a P-type transistor, the first power terminal VSS may be multiplexed into the second power terminal.

Figure 11:
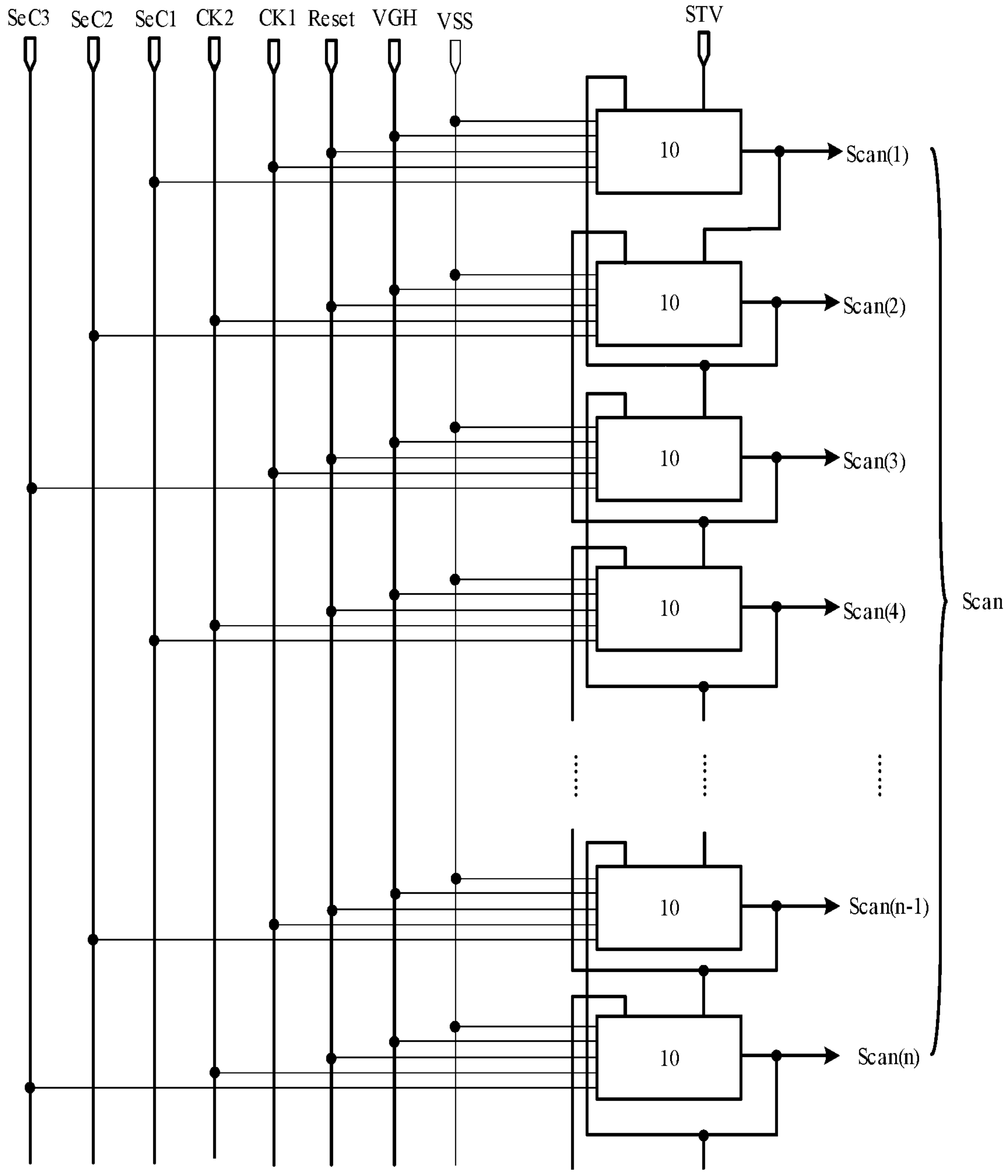
FIG. 11 is a second cascade schematic diagram of a plurality of stages of the gate driving circuits provided by embodiments of the present application.

FIG. 11 is a second cascade schematic diagram of a plurality of stages of the gate driving circuits provided by embodiments of the present application. A plurality of isolation control signals SeC may be provided corresponding to the plurality of gate driving circuits. Thus, the isolation transistor Ts of each gate driving circuit is turned off after the gate control signal with an effective pulse is output, so as to reduce power consumption corresponding to each gate driving circuit, and influence of the potential variation of the first node N1 on the potential of the second node N2 is better blocked.

Optionally, since each gate driving circuit needs a corresponding one of the isolation control signals SeC, a layout space occupied by the gate driving unit is increased. Thus, the plurality of gate driving circuits may share the plurality of isolation control signals SeC in order to give consideration to power consumption, control difficulty, layout space, and blocking effect between the electric potential of the first node N1 and the electric potential of the second node N2.

Optionally, the plurality of the gate driving circuits may share Z isolation control signals SeC, so that the plurality of the gate driving circuits may sequentially output gate control signals Scan(N). Wherein, Z≥1. It can be understood that the number of isolation control signals SeC shared by the plurality of gate driving circuits can be set according to actual requirements.

Optionally, among the plurality of gate driving circuits, two gate driving circuits separated by p-stage gate driving circuits share one of the isolation control signals SeC. Wherein p≥1. In a specific embodiment, as shown in FIG. 11, p=2, a first-stage gate driving circuit and a fourth-stage gate driving circuit are separated by two-stage gate driving circuits (i.e., a second-stage gate driving circuit and a third-stage gate driving circuit). The first-stage gate driving circuit and the fourth-stage gate driving circuit share a first isolation control signal SeC1. Similarly, the first-stage gate driving circuit, the fourth-stage gate driving circuit, a seventh-stage gate driving circuit, and etc. share the first isolation control signal SeC. Similarly, the second-stage gate driving circuit, a fifth-stage gate driving circuit, an eighth-stage gate driving circuit, and etc. share a second isolation control signal SeC2. The third-stage gate driving circuit, a sixth-stage gate driving circuit, a ninth-stage gate driving circuit, and etc. share a third isolation control signal SeC3.

Figure 12:
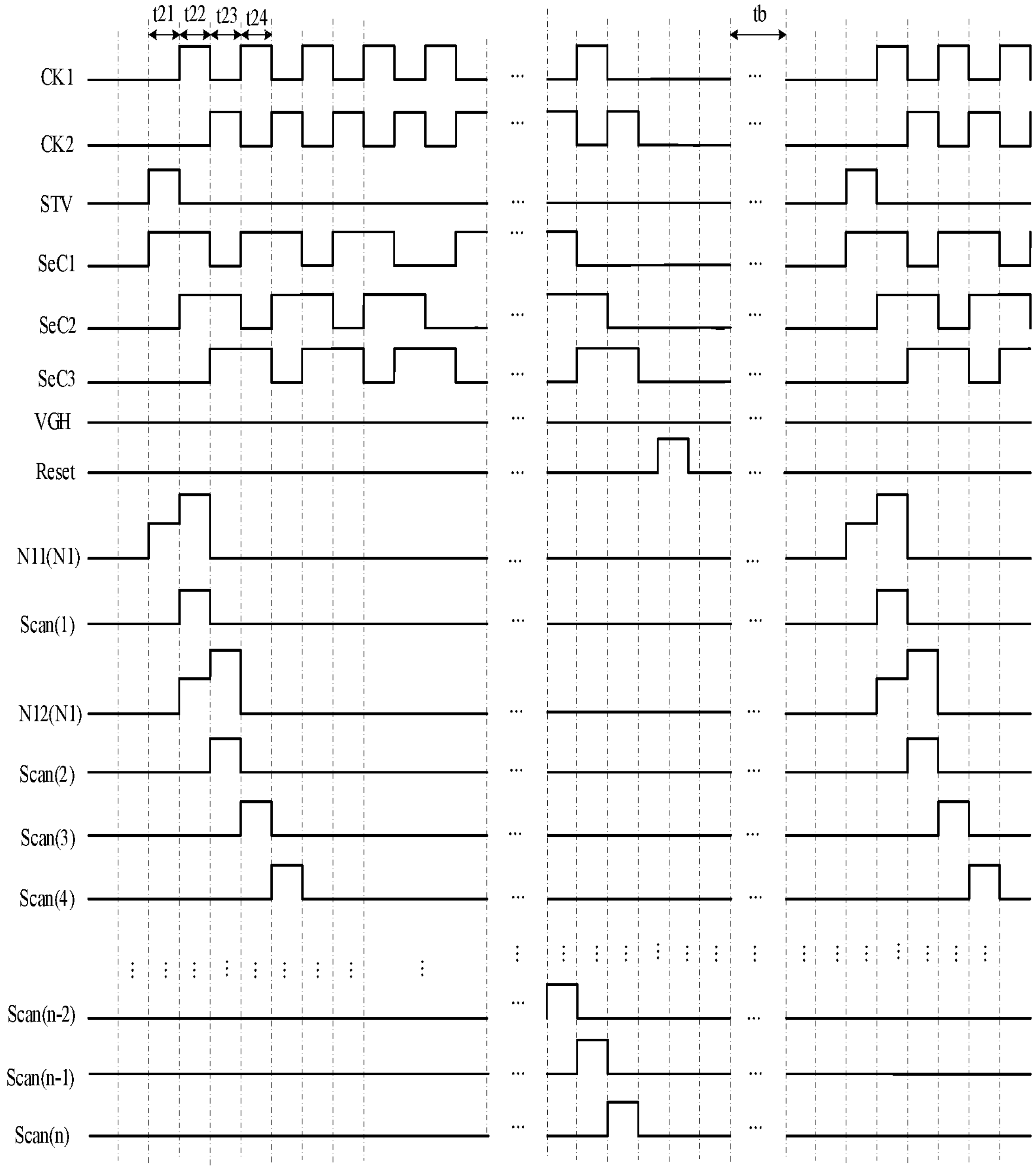
FIG. 12 is a first timing diagram applied by a plurality of stages of the gate driving circuits provided by embodiments of the present application.

FIG. 12 is a first timing diagram applied by a plurality of stages of the gate driving circuits provided by embodiments of the present application. The operation principle of the gate driving unit is described by taking following conditions as examples. Gate driving circuits of odd-numbered stages are electrically connected to the first clock signal line, and gate driving circuits of even-numbered stages are electrically connected to the second clock signal line. The plurality of gate driving circuits share three isolation control signals SeC (i.e., the first-stage gate driving circuit, the fourth-stage gate driving circuit, the seventh-stage gate driving circuit, and etc. share the first isolation control signal SeC1; the second-stage gate driving circuit, the fifth-stage gate driving circuit, the eighth-stage gate driving circuit, and etc. share the second isolation control signal SeC2; the third-stage gate driving circuit, the sixth-stage gate driving circuit, the ninth-stage gate driving circuit, and etc. share the third isolation control signal SeC3). Each stage of the gate driving circuits behind the first-stage gate driving circuit takes the gate control signal output by the preceding one-stage gate driving circuit as the pull-up control signal, and each stage of the gate driving circuits take the gate control signal output by the succeeding one-stage gate driving circuit as the pull-down control signal (i.e., X=Y=1).

A first stage t21, the start signal STV and the first isolation control signal SeC1 are high-level voltages; and the first clock signal CK1 transmitted by the first clock signal line, the second clock signal CK2 transmitted by the second clock signal line, the second isolation control signal SeC2, the third isolation control signal SeC3 and the reset control signal Reset are low-level voltages.

In the first-stage gate driving circuit, the pull-up control transistor Tu is turned on according To the start signal STV, the isolation transistor Ts is turned on according To the first isolation control signal SeC1. Thus, the electric potential of the first node (i.e. N11 in 12) and the electric potential of the second node N2 are raised, so that the pull-up transistor To, the second transistor T2 and the fourth transistor T4 are turned on. A first-stage gate control signal Scan(1) output by the first-stage gate driving circuit has a low level state. The first pull-down maintaining transistor Th1 and the second pull-down maintaining transistor Th2 are turned off.

Due to the plurality of gate driving circuits cascaded behind the first-stage gate driving circuit take the gate control signal output by the preceding one-stage gate driving circuit as the pull-up control signal, so that gate control signals Scan(2) to Scan (n) output by the plurality of gate driving circuits cascaded behind the first-stage gate driving have a low-level state.

A second stage t22, the first isolation control signal SeC1, the second isolation control signal SeC2, and the first clock signal CK1 are high-level voltages, and the start signal STV, the second clock signal CK2, the third isolation control signal SeC3, and the reset control signal Reset are low-level voltages.

In the first-stage gate driving circuit, the pull-up control transistor Tu is turned off, the electric potential of the first node N1 is further raised, and the pull-up transistor To, the second transistor T2, and the fourth transistor T4 are turned on. Thus, the first-stage gate control signal Scan(1) output by the first-stage gate driving circuit has a high level state, and the first pull-down maintaining transistor Th1 and the second pull-down maintaining transistor Th2 are turned off.

The second-stage gate driving circuit uses the first-stage gate control signal Scan(1) output by the first-stage gate driving circuit as a pull-up control signal, and performs the same operation as the first-stage gate driving circuit in the first stage t21. Gate control signals Scan(3) to Scan(n) output by a plurality of gate driving circuits cascaded behind the second-stage gate driving circuit are kept at a state outputting a low level voltage.

A third stage t23, the second isolation control signal SeC2, the third isolation control signal SeC3, and the second clock signal CK2 are high-level voltages, and the start signal STV, the first clock signal CK1, the first isolation control signal SeC1, and the reset control signal Reset are low-level voltages.

The second-stage gate driving circuit performs the same operation as the first-stage gate driving circuit in the second stage t22, so that the second-stage gate control signal Scan(2) output by the second-stage gate driving circuit has a high-level state.

Since the first-stage gate driving circuit uses the second-stage gate control signal Scan(2) output by the second-stage gate driving circuit as a pull-down control signal. Thus, in the first-stage gate driving circuit, the first pull-down transistor Td1 and the second pull-down transistor Td2 are turned on according to the second-stage gate control signal Scan(2). Thus, the first-stage gate control signal Scan(1) has a low level state; the electric potential of the second node N2 is pulled down; the second transistor T2 and the fourth transistor T4 are turned off; the first transistor T1, the third transistor T3, the first pull-down maintaining transistor Th1, and the second pull-down maintaining transistor Th2 are turned on; and the electric potential of the first node N1 is pulled down, and the pull-up transistor To is turned off.

The third-stage gate driving circuit uses the second-stage gate control signal Scan(2) output by the second-stage gate driving circuit as a pull-up control signal, and performs the same operation as the second-stage gate driving circuit in the second stage t22. Gate control signals Scan(4) to Scan(n) output by a plurality of gate driving circuits cascaded behind the third-stage gate driving circuit are kept at a state outputting a low level voltage.

A fourth stage t24, the first isolation control signal SeC1, the third isolation control signal SeC3, and the first clock signal CK1 are high-level voltages, and the start signal STV, the second clock signal CK2, the second isolation control signal SeC2, and the reset control signal Reset are at low-level voltages.

The first-stage gate control signal Scan(1) output by the first-stage gate driving circuit is kept in a low-level state. The second-stage gate driving circuit performs the same operation as the first-stage gate driving circuit in the third stage t23, so that the second-stage gate control signal Scan(2) output by the second-stage gate driving circuit has a low-level state. The third-stage gate driving circuit performs the same operation as the second-stage gate driving circuit in the third stage t23, so that the third-stage gate control signal Scan(3) output by the third-stage gate driving circuit has a high-level state.

Since the fourth-stage gate driving circuit uses the third-stage gate control signal Scan(3) output by the third-stage gate driving circuit as a pull-up control signal, and the isolation transistor Ts in the fourth-stage gate driving circuit is turned on according to the first isolation control signal SeC1. Thus, the fourth-stage gate driving circuit performs the same operation as the first-stage gate driving circuit in the first stage t21, so that the fourth-stage gate control signal Scan(4) output by the fourth-stage gate driving circuit has a low-level state.

The gate control signals Scan(5) to Scan(n) output by a plurality of gate driving circuits cascaded behind the fourth-stage gate driving circuit are kept at a state outputting a low level voltage.

By analogy, the operation principle that the gate control signals Scan(5) to Scan(n) output by the fourth-stage gate driving circuit and a plurality of gate driving circuits cascaded behind the fourth-stage gate driving circuit have a high-level state in turn can be obtained.

Optionally, after the plurality of gate driving circuits sequentially output effective pulses of a plurality of gate control signals Scan, the reset control signal Reset has an effective pulse. Thus, the first reset transistors Ti1 and the second reset transistors Ti2 included in the plurality of gate driving circuits are turned on to initialize the electric potentials of the second node N2, the electric potentials of the signal output terminal G(N), and the electric potentials of both electrode plates of the first capacitor C1 of the plurality of gate driving circuits.

Optionally, the reset control signal Reset may have an effective pulse after the last stage gate driving circuit outputs an effective pulse, or may have an effective pulse within an vertical blanking interval tb, so as to improving a problem that the effective pulse of the reset control signal Reset appears in frames corresponding to a case that the display panel displays so that abnormal display occurs.

It can be understood that the operating principle of the gate driving unit corresponding to a case that a plurality of gate driving circuits are arranged in cascade, and the control terminals of the isolation transistors Ts included in the plurality of gate driving circuits are electrically connected to the second power terminal V2, can be obtained by referring to the operating principle that the plurality of gate driving circuits share a plurality of isolation control signals SeC. It is not repeated here.

Figure 13:
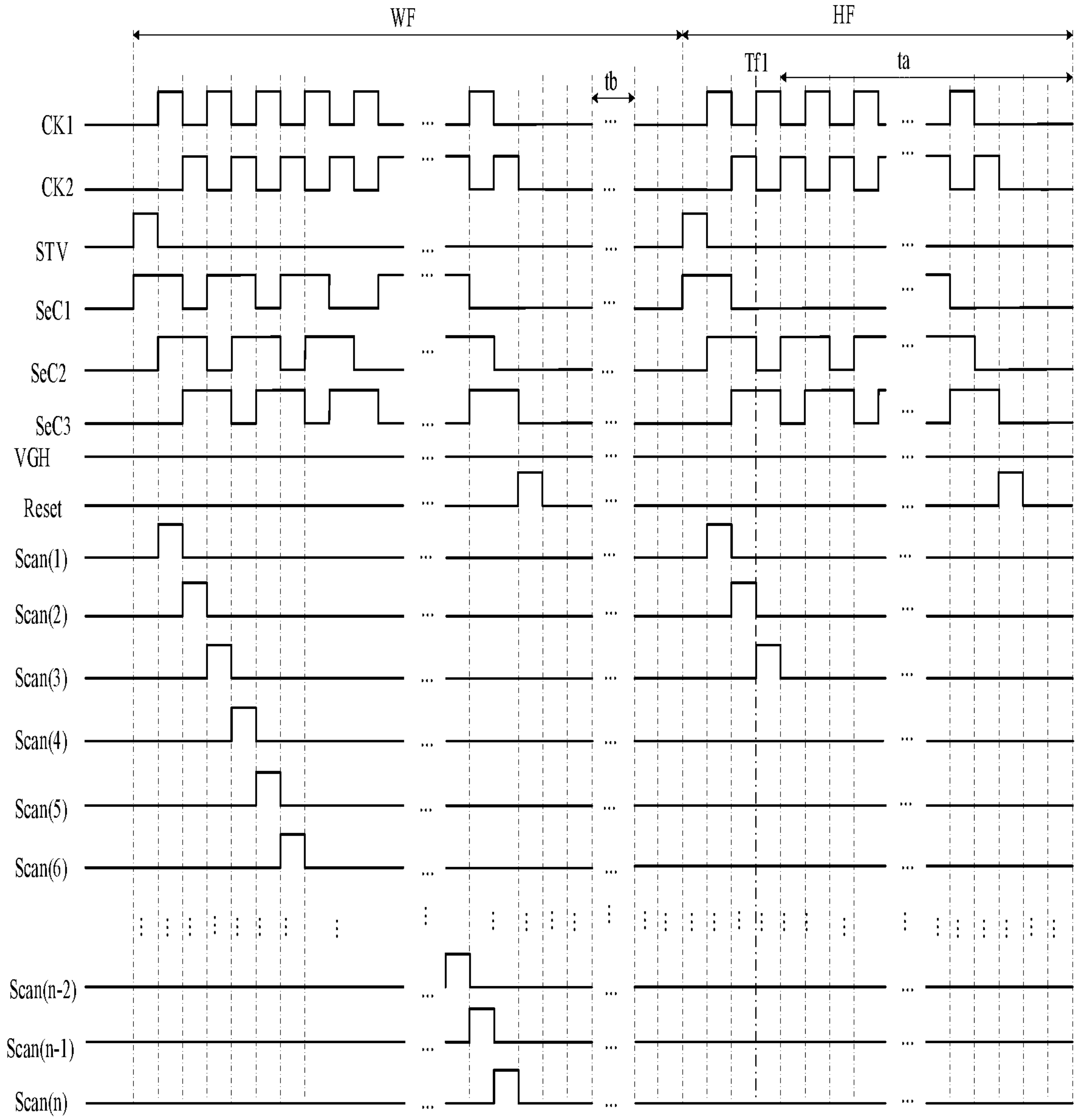
FIG. 13 is a second timing diagram applied by a plurality of stages of the gate driving circuits provided by embodiments of the present application.

Optionally, FIG. 13 is a second timing diagram applied by a plurality of stages of the gate driving circuits provided by embodiments of the present application. In the case that the plurality of gate driving circuits are arranged in cascade, and the plurality of gate driving circuits share the plurality of isolation control signals SeC, controls of area-division and frequency-division of the display panel can also be realized by controlling the isolation control signals SeC.

Optionally, the isolation transistor Ts in a corresponding one of the gate driving circuits may be controlled to remain to be turned off by controlling whether the isolation control signal SeC has an effective pulse, so that the pull-up transistor To of the corresponding one of the gate driving circuits cannot be turned on. And then, a corresponding one of the clock signals CK is not output to the signal output terminal G(N), and then the gate control signal Scan(N) output by the corresponding one of the gate driving circuits is controlled to have no effective pulse.

In a specific embodiment, referring to FIG. 13, still taking it that the first isolation control signal SeC1 is shared by the first-stage gate driving circuit, the fourth-stage gate driving circuit, the seventh-stage gate driving circuit, and etc.; the second isolation control signal SeC2 is shared by the second-stage gate driving circuit, the fifth-stage gate driving circuit, the eighth-stage gate driving circuit, and etc.; and the third isolation control signal SeC3 is share by the third-stage gate driving circuit, the sixth-stage gate driving circuit, and the ninth-stage gate driving circuit, and etc as an example, the operating principle of controlling the isolation control signals SeC to realize controls of area-division and frequency-division of the display panel is explained. Wherein, in order to realize controls of area-division and frequency-division, a display period may include a writing frame WF and a holding frame HF. A control terminal of a driving transistor of a pixel driving circuit included in a subpixel has an operation of writing a data signal corresponding to the writing frame WF. A control terminal of the driving transistor included in the subpixel does not have the operation of writing the data signal corresponding to the holding frame HF.

In the writing frame WF, the plurality of gate control signals Scan(N) output by the plurality of gate driving circuits have effective pulses in sequence, so that a pixel driving circuit of a corresponding one of subpixels may control a data signal to be normally written into a gate of the driving transistor according to a corresponding one of the gate control signals Scan(1) to Scan(n).

In the holding frame HF, in a case the display panel has a frequency-division in a row where the subpixels connected to the fourth-stage gate driving circuit are disposed, the first isolation control signal SeC1 can be correspondingly controlled without a leap from a non-effective pulse to an effective pulse at a first frequency division time Tf1. Thus, in a case that the fourth-stage gate driving circuit receives the third-stage gate control signal Scan(3) output by the third-stage gate driving circuit, the isolation transistor Ts of the fourth-stage gate driving circuit still remains to be turned off, and then the pull-up transistor To is always kept in an off state. The fourth-stage gate control signal Scan(4) output by the fourth-stage gate driving circuit cannot have a high-level state even in a case that the first clock signal CK1 is in a high-level state. As a result, subpixels electrically connected to the fourth-stage gate driving circuit cannot achieve it that the data signal is rewritten into the control terminal of the driving transistor, so that a row of the subpixels electrically connected to the fourth-stage gate driving circuit display the same picture as the writing frame WF.

The first-stage gate control signals Scan(1) to the third-stage gate control signals Scan(3) output by the first-stage gate driving circuit to the third-stage gate driving circuit still have a high-level state in sequence, so that for each row of subpixels electrically connected to the first-stage gate driving circuit to the third-stage gate driving circuit, that the data signals are rewritten into the control terminals of the driving transistors is controlled. Rows of the sub-pixels electrically connected to the first-stage gate driving circuit to the third-stage gate driving circuit can display a picture different from the writing frame WF.

However, pull-up control signals Scan(4)~Scan(n−1) received by a plurality of gate driving circuits cascaded behind the fourth-stage gate driving circuit have no effective pulse, so that a plurality of gate driving circuits cascaded behind the fourth-stage gate driving circuit can not output gate control signals Scan(5) to Scan(n).

The third-stage gate driving circuit uses the fourth-stage gate control signal Scan(4) output by the fourth-stage gate driving circuit as a pull-down control signal. Thus, in order to avoid that the electric potential the first node N1 and the electric potential of the second node N2 of the third-stage gate driving circuit cannot be further pulled down in a case that the fourth-stage gate control signal Scan(4) output by the fourth-stage gate driving circuit has no effective pulse, the first reset transistor Ti1 and the second reset transistor Ti2 of the third-stage gate driving circuit can be independently controlled to be turned on by the reset control signal Reset, so as to further pull down the electric potential of the first node N1 and the electric potential of the second node N2.

In addition, the fourth-stage gate driving circuit and the gate driving circuits cascaded to the fourth-stage gate driving circuit do not output an effective pulse due to the influence of the isolation control signals SeC. Thus, the reset control signal Reset can be controlled to have an effective pulse at the first frequency division time Tf1, so that the first reset transistor Ti1 and the second reset transistor Ti2 of all the gate driving circuits can be controlled to be simultaneously turned on by the reset control signal Reset. That the electric potential of the first node N1 and the electric potential of the second node N2 of the third-stage gate driving circuit can be further pulled down can be achieved.

For the display panel has a frequency-dividing at a fixed position, a frequency division pull-down transistor can also be arranged in the corresponding gate driving circuit. An input terminal of the frequency division pull-down transistor is electrically connected to the first power terminal VSS. An output terminal of the frequency division pull-down transistor is electrically connected to corresponding ones of the first node N1 and the second node N2. A control terminal of the frequency division pull-down transistor receives a frequency division pull-down control signal to control the frequency division pull-down transistor to be turned on at the corresponding frequency division time and pull down the electric potentials of the first node N1 and the second node N2 of the corresponding gate driving circuit. For example, a frequency division pull-down transistor may be arranged in the third-stage gate driving circuit. An input terminal of the frequency division pull-down transistor is electrically connected to the first power terminal VSS. An output terminal of the frequency division pull-down transistor is electrically connected to the first node N1 and the second node N2 in the third-stage gate driving circuit. A control terminal of the frequency division pull-down transistor receives the frequency division pull-down control signal. The frequency division pull-down control signal has an effective pulse at the first frequency division time Tf1.

It can be understood that output of the fourth-stage gate driving circuit controlled by controlling the effective pulse of the first isolation control signal SeC1 is taken as an example to control area-division and frequency-division of the display panel in the present application. Similarly, at least one of the second isolation control signal SeC2 and the third isolation control signal SeC3 can be controlled to realizes the control of area-division and frequency-division of the display panel.

Optionally, in a case that at least one of the plurality of isolation control signals SeC realizes the control of area-division and frequency-division of the display panel, remaining isolation control signals SeC can be controlled to become low-level voltages after the frequency division time and corresponding effective pulses are output, so as to reduce power consumption. As in a stage ta in FIG. 13, the second isolation control signal SeC2 and the third isolation control signal SeC3 may be maintained at a low level.

In the present application, specific examples are applied to explain principles and implementations of the present application, and the above description of the embodiments is only used to help understand the method and core ideas of the present application; Meanwhile, for those skilled in the art, according to ideas of the present application, there may be changes in the specific implementation modes and application scopes. In summary, the contents of this specification should not be understood as limiting the present application.

What is claimed is:

1. A gate driving circuit, comprising:

a pull-up module electrically connected to a first node, wherein the pull-up module is configured to connect a clock signal line and a signal output terminal of the gate driving circuit, or to disconnect an electrical connection between the clock signal line and the signal output terminal according to an electric potential of the first node;

an isolation module electrically connected to the first node and a second node, wherein the isolation module is configured to block a coupling effect of an electric potential variation of the first node on an electric potential of the second node;

a pull-down maintaining module electrically connected to the first node and a first power terminal; and an inverting module electrically connected to the second node, wherein the inverting module is configured to control the pull-down maintaining module to connect the first power terminal and the first node, or disconnect an electrical connection between the first power terminal and the first node according to the electric potential of the second node.

2. The gate driving circuit according to claim 1, wherein the isolation module comprises an isolation transistor, a control terminal of the isolation transistor is electrically connected to a second power terminal, an input terminal of the isolation transistor is electrically connected to the second node, and an output terminal of the isolation transistor is electrically connected to the first node.

3. The gate driving circuit according to claim 2, wherein the isolation module further comprises a first capacitor connected in series between the signal output terminal and the second node.

4. The gate driving circuit according to claim 1, wherein the pull-up module comprises:

a pull-up transistor, wherein a control terminal of the pull-up transistor is electrically connected to the first node, an input terminal of the pull-up transistor is electrically connected to the clock signal line, and an output terminal of the pull-up transistor is electrically connected to the signal output terminal; and a bootstrap capacitor connected in series between the first node and the signal output terminal.

5. The gate driving circuit according to claim 1, wherein the inverting module comprises:

a first transistor, wherein a control terminal of the first transistor is electrically connected to a third power terminal, and an input terminal of the first transistor is electrically connected to the third power terminal;

a second transistor, wherein a control terminal of the second transistor is electrically connected to the second node, an output terminal of the second transistor is electrically connected to an output terminal of the first transistor, and an input terminal of the second transistor is electrically connected to the first power terminal;

a third transistor, wherein a control terminal of the third transistor is electrically connected to the output terminal of the first transistor, an input terminal of the third transistor is electrically connected to the third power terminal, and an output terminal of the third transistor is electrically connected to the pull-down maintaining module through a third node; and a fourth transistor, wherein a control terminal of the fourth transistor is electrically connected to the second node, an input terminal of the fourth transistor is electrically connected to the first power terminal, and an output terminal of the fourth transistor is electrically connected to the third node.

6. The gate driving circuit according to claim 5, wherein the pull-down maintaining module comprises:

a first pull-down maintaining transistor, wherein a control terminal of the first pull-down maintaining transistor is electrically connected to the third node, an input terminal of the first pull-down maintaining transistor is electrically connected to the first power terminal, and an output terminal of the first pull-down maintaining transistor is electrically connected to the first node; and a second pull-down maintaining transistor, wherein a control terminal of the second pull-down maintaining transistor is electrically connected to the third node, an input terminal of the second pull-down maintaining transistor is electrically connected to the first power terminal, and an output terminal of the second pull-down maintaining transistor is electrically connected to the signal output terminal.

7. The gate driving circuit according to claim 1, further comprising:

a pull-down module, comprising:

a first pull-down transistor, wherein a control terminal of the first pull-down transistor is configured to receive a pull-down control signal, an input terminal of the first pull-down transistor is electrically connected to the first power terminal, and an output terminal of the first pull-down transistor is electrically connected to the second node; and a second pull-down transistor, wherein a control terminal of the second pull-down transistor is configured to receive the pull-down control signal, an input terminal of the second pull-down transistor is electrically connected to the first power terminal, and an output terminal of the second pull-down transistor is electrically connected to the signal output terminal.

8. The gate driving circuit according to claim 1, further comprising:

a reset module, comprising:

a first reset transistor, wherein a control terminal of the first reset transistor is configured to receive a reset control signal, an input terminal of the first reset transistor is electrically connected to the first power terminal, and an output of the first reset transistor is electrically connected to the second node; and a second reset transistor, wherein a control terminal of the second reset transistor is configured to receive the reset control signal, an input terminal of the second reset transistor is electrically connected to the first power terminal, and an output terminal of the second reset transistor is electrically connected to the signal output terminal.

9. The gate driving circuit according to claim 1, further comprising:

a pull-up control module, comprising:

a pull-up control transistor, wherein a control terminal and an input terminal of the pull-up control transistor are configured to receive a pull-up control signal, and an output terminal of the pull-up control transistor is electrically connected to the second node.

10. A display device comprising a gate driving unit, the gate driving unit comprising a plurality of gate driving circuits cascaded to each other, wherein at least one of the gate driving circuits comprises:

a pull-up module electrically connected to a first node, wherein the pull-up module is configured to connect a clock signal line and a signal output terminal of the gate driving circuit, or to disconnect an electrical connection between the clock signal line and the signal output terminal according to an electric potential of the first node;

an isolation module electrically connected to the first node and a second node, wherein the isolation module is configured to block a coupling effect of an electric potential variation of the first node on an electric potential of the second node;

a pull-down maintaining module electrically connected to the first node and a first power terminal; and an inverting module electrically connected to the second node, wherein the inverting module is configured to control the pull-down maintaining module to connect the first power terminal and the first node, or to disconnect an electrical connection between the first power terminal and the first node according to the electric potential of the second node.

11. The display device according to claim 10, wherein the isolation module comprises an isolation transistor, a control terminal of the isolation transistor is electrically connected to a second power terminal, an input terminal of the isolation transistor is electrically connected to the second node, and an output terminal of the isolation transistor is electrically connected to the first node.

12. The display device according to claim 11, wherein the isolation module further comprises a first capacitor connected in series between the signal output terminal and the second node.

13. The display device according to claim 10, wherein the pull-up module comprises:

a pull-up transistor, wherein a control terminal of the pull-up transistor is electrically connected to the first node, an input terminal of the pull-up transistor is electrically connected to the clock signal line, and an output terminal of the pull-up transistor is electrically connected to the signal output terminal; and a bootstrap capacitor connected in series between the first node and the signal output terminal.

14. The display device according to claim 10, wherein the inverting module comprises:

a first transistor, wherein a control terminal of the first transistor is electrically connected to a third power terminal, and an input terminal of the first transistor is electrically connected to the third power terminal;

a second transistor, wherein a control terminal of the second transistor is electrically connected to the second node, an output terminal of the second transistor is electrically connected to an output terminal of the first transistor, and an input terminal of the second transistor is electrically connected to the first power terminal;

a third transistor, wherein a control terminal of the third transistor is electrically connected to the output terminal of the first transistor, an input terminal of the third transistor is electrically connected to the third power terminal, and an output terminal of the third transistor is electrically connected to the pull-down maintaining module through a third node; and a fourth transistor, wherein a control terminal of the fourth transistor is electrically connected to the second node, an input terminal of the fourth transistor is electrically connected to the first power terminal, and an output terminal of the fourth transistor is electrically connected to the third node.

15. The display device according to claim 14, wherein the pull-down maintaining module comprises:

a first pull-down maintaining transistor, wherein a control terminal of the first pull-down maintaining transistor is electrically connected to the third node, an input terminal of the first pull-down maintaining transistor is electrically connected to the first power terminal, and an output terminal of the first pull-down maintaining transistor is electrically connected to the first node; and a second pull-down maintaining transistor, wherein a control terminal of the second pull-down maintaining transistor is electrically connected to the third node, an input terminal of the second pull-down maintaining transistor is electrically connected to the first power terminal, and an output terminal of the second pull-down maintaining transistor is electrically connected to the signal output terminal.

16. The display device according to claim 10, further comprising:

a pull-down module, comprising:

a first pull-down transistor, wherein a control terminal of the first pull-down transistor is configured to receive a pull-down control signal, an input terminal of the first pull-down transistor is electrically connected to the first power terminal, and an output terminal of the first pull-down transistor is electrically connected to the second node; and a second pull-down transistor, wherein a control terminal of the second pull-down transistor is configured to receive the pull-down control signal, an input terminal of the second pull-down transistor is electrically connected to the first power terminal, and an output terminal of the second pull-down transistor is electrically connected to the signal output terminal.

17. The display device according to claim 10, further comprising:

a reset module, comprising:

a first reset transistor, wherein a control terminal of the first reset transistor is configured to receive a reset control signal, an input terminal of the first reset transistor is electrically connected to the first power terminal, and an output of the first reset transistor is electrically connected to the second node; and a second reset transistor, wherein a control terminal of the second reset transistor is configured to receive the reset control signal, an input terminal of the second reset transistor is electrically connected to the first power terminal, and an output terminal of the second reset transistor is electrically connected to the signal output terminal.

18. The display device according to claim 10, further comprising:

a pull-up control module, comprising:

a pull-up control transistor, wherein a control terminal and an input terminal of the pull-up control transistor are configured to receive a pull-up control signal, and an output terminal of the pull-up control transistor is electrically connected to the second node.

19. The display device according to claim 18, wherein the isolation module comprises an isolation transistor, an input terminal of the isolation transistor is electrically connected to the second node, and an output terminal of the isolation transistor is electrically connected to the first node; and wherein a control terminal of the isolation transistor of a first-stage gate driving circuit in the plurality of gate driving circuits, and a control terminal of the isolation transistor of a fourth-stage gate driving circuit in the plurality of gate driving circuits are configured to receive a first isolation control signal;

a control terminal of the isolation transistor of a second-stage gate driving circuit in the plurality of gate driving circuits, and a control terminal of the isolation transistor of a fifth-stage gate driving circuit of the plurality of gate driving circuits are configured to receive a second isolation control signal; and a control terminal of the isolation transistor of a third-stage gate driving circuit in the plurality of gate driving circuits, and a control terminal of the isolation transistor of the sixth-stage gate driving circuit in the plurality of gate driving circuits are configured to receive a third isolation control signal.

20. The display device according to claim 19, wherein the pull-up control signal received by the control terminal of the pull-up control transistor of the fourth-stage gate driving circuit is a gate control signal output by the third-stage gate driving circuit; and wherein during a first frequency division moment of a holding frame, the pull-up control transistor of the fourth-stage gate driving circuit is turned on in response to the gate control signal output by the third-stage gate circuit, the isolation transistor of the fourth-stage gate driving circuit is turned off in response to the first isolation control signal.

* * * * *